*Inventor*
ROBERT E. SHERWOOD

By Lawrence H. Cohen

*Attorney*

United States Patent Office 3,605,689
Patented Sept. 20, 1971

3,605,689
DEVICE FOR EVENLY DISTRIBUTING A
FLOWABLE MASS
Robert E. Sherwood, Cincinnati, Ohio, assignor to
W. R. Grace & Co., Cambridge, Mass.
Filed Aug. 12, 1969, Ser. No. 849,396
Claims priority, application Germany, Aug. 13, 1968,
P 17 79 450.2
Int. Cl. B05c 3/00
U.S. Cl. 118—407            11 Claims

ABSTRACT OF THE DISCLOSURE

A device for overcoming difficulties in the continuous distribution of a relatively quickly solidifying flowable mass over a relatively broad surface where a layer of uniform thickness is required and no air or gas bubbles should be produced in the mass. In prior art devices damming by a distributor causes a greater hydrostatic pressure at the centre with consequent thickening of the centre portion of the distributed layer. A large container with a discharge slit cannot be used where the mass solidifies too quickly to be wholly discharged before solidification. The device comprises a distributor plate having a surface inclined in the direction of flow, a feed line for discharging the flowable mass onto the inclined surface of the distribution plate, a predistributor narrower than the desired final extent of spreading located downstream of the feed line and spaced from the surface of the plate for initially spreading the flowable mass widthwise of the plate, and a main distributor arranged downstream of the predistributor and spaced from the surface of the plate for distributing to the full width the initially distributed mass, and means for varying the spacing of the distributors from the plate surface for controlling the thickness of the layer to be formed.

---

Figure 1:
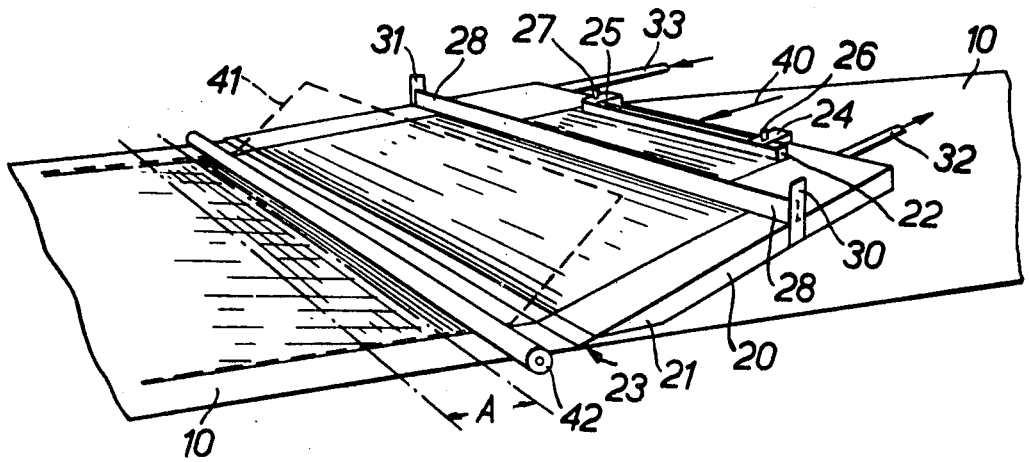

This invention relates to a device for evenly distributing a relatively quickly solidifying flowable mass over a surface.

Such a mass may be a melt which solidifies upon cooling or a mixture containing a thermosetting resin which condenses and solidifies per se or upon heating. The device of the invention is particularly suitable for feeding such a mass into a continuously operating pressing or rolling device, for example a calender or a device wherein the mass is solidified between two superposed endless belts.

Difficulty has previously arisen in the continuous distribution of a relatively quickly solidifying flowable mass over a relatively broad surface where a layer of uniform thickness is required and no air or gas bubbles should be produced in the mass.

It has been tried to overcome this difficulty by feeding the mass onto a plate on which a distributor is arranged in such a way that a space of the desired film thickness is left between the distributor and the surface of the plate. However, due to the damming effect occurring at the distributor the mass delivered from a feed line upstream of the distributor tends to accumulate near the outlet of the feed line near the centre of the distributor so that the hydrostatic pressure of the mass at the middle section of the distributor is substantially greater than at both sides. As a result, the mass is pressed in the middle with an increased pressure through the slit between the distributor and the plate so that the layer downstream of the distributor is not uniform in thickness but is substantially thinner in the outer zones than in the middle zone.

This difficulty is particularly acute when the mass to be distributed without inclusion of gas bubbles and in a uniform thickness solidifies rapidly so that the distribution must be accomplished within a very short time, that is between about ½ and 10 minutes. This is especially the case when the mass contains a condensable resin and a condensation accelerator; in this case the mixture must be distributed and fed into the pressing or rolling device immediately after the raw materials have been mixed since otherwise, because of the spontaneous exothermic reaction of condensation, gelation of the mass would occur within a short time preventing further processing. Thus it is obvious that the mass cannot be fed for example from a large container having a corresponding slit-shaped orifice and where a consistent hydrostatic pressure could be obtained across the full width of the slit, since the residence time in such a container would be much too high and the mass would solidify before it could be spread.

According to the invention there is provided a device for evenly distributing a quickly solidifying flowable mass over a surface, such device comprising a distributor plate inclined in the direction of flow, a feed line for discharging the flowable mass onto the surface of the distribution plate, a predistributor narrower than the desired final extent of spreading located downstream of the feed line and spaced from the surface of the plate for initially spreading the flowable mass widthwise of the plate, and a main distributor arranged downstream of the predistributor and spaced from the surface of the plate for distributing to the full width the initially distributed mass, the spacing of the distributors from the plate surface being dependent upon the thickness of the layer to be formed.

It has surprisingly been found that the difficulties encountered when using only one distributor member can be avoided by using a predistributor upstream of this main distributor member which predistributes the mass discharged from a feed line and accumulating initially at only one point to a broad layer. Even though the layer leaving the slit between the predistributor and the distribution plate is not fully uniform in thickness due to the above-mentioned differential damming effect at the predistributor, it is achieved by this predistribution that substantially no pressure gradient occurs widthwise of the main distributor so that the thickness of the layer behind the main distributor is completely uniform over the entire width.

Preferably the predistributor as well as the main distributor are adjustably mounted for variation of their distance from the distribution plate so that the width of the spacing between the distributors and the plate can be varied as required. The most favourable values for the distance between the predistributor and the main distributor can easily be determined by a few experiments; they are primarily dependent on the desired film thickness but require also adaptation to the physical properties of the mass, in particular the viscosity thereof. The predistributor is preferably a polygonal bar, one longitudinal surface thereof being suitably arranged in parallel to the surface of the distribution plate. Thus a slit defined by two surfaces is obtained which serves for a better distribution of the mass despite the pressure differences occurring before the distributor. The main distributor is preferably a blade-shaped member, the edge of which must be exactly parallel to the distribution plate when it is desired to produce a uniform layer thickness. However, it is also possible—when this is desired for special reasons—to use the distributors in an arrangement non-parallel to the distribution plate so that a layer is obtained which continuously increases in thickness from one side to the other over the entire width.

A further adaptation of the device to the physical properties of the mass to be distributed can be obtained by varying the slope of the distribution plate; it is clear that the plate must be the steeper the higher the viscosity of the mass and the lower the rate of flow over the plate associated therewith. It has been found especially favourable that the distribution plate should terminate in a knife-like edge which engages a roller or belt surface onto which the distributed mass is to be passed. Thus a continuous transfer from the distribution plate to the pressing or rolling device and a resilient mounting of the distribution plate is obtained.

Often it is desired to incorporate a reinforcing material into sheets or plates prepared from melts, thermosetting resins or similar masses. Therefore a preferred embodiment of the invention comprises additional means for feeding such a reinforcing material, e.g. a fibrous mat or fabric sheet, into the device. This means is arranged in such a way that the reinforcing material is fed to the already evenly distributed mass downstream of the distribution plate. Dependent on the wetting properties of the mass itself and of the reinforcing material, the latter remains on the surface of the mass or is melted and taken up by the mass.

Dependent on the mass to be processed, it may be necesary either to heat or cool the distribution plate. Heating is necessary or at least desired in particular when the mass is a rapidly solidifying melt. On the other hand, when mixtures which contain condensable resins are processed, cooling may be suitable or necessary to prevent gelation or solidification of the mass already on the distribution plate before it has reached the pressing or rolling device.

Figure 2:
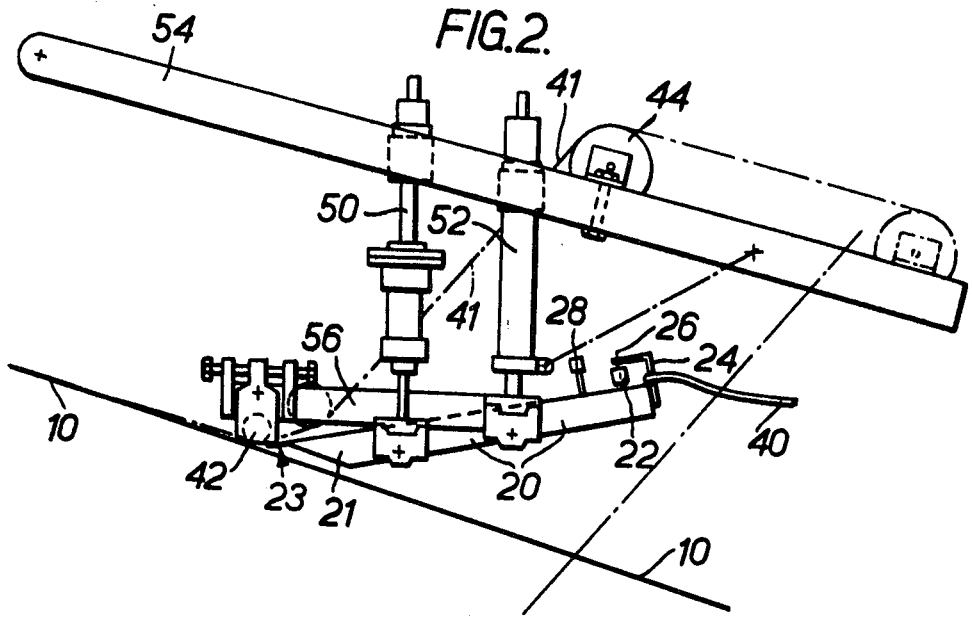

The invention is further illustrated with reference to the accompanying drawings, in which:

FIG. 1 is a perspective diagrammatic view of a distribution device embodying the invention wherein the frame of the device with all its members has been omitted in order to increase the clearness, and FIG. 2 is an enlarged side view of the means for introducing the reinforcing material used with the device of FIG. 1.

As mentioned above, the mass to be distributed may be a melt, e.g. a molten thermoplastic resin or a glass melt. The mass to be processed can, however, also be a mixture containing a thermosetting resin, e.g. an aqueous suspension or a solution of such a resin with or without other additives. Such mixtures are often processed with the addition of an accelerator which is normally added just before processing the mass since thereafter a spontaneous exothermic condensation reaction takes place. The mass is fed via appropriate metering means through a feed line 40 onto a distribution plate 20. Often it is advantageous to provide the surface of the distribution plate with a coating which reduces the adhesion of the mass. For many purposes a coating of, for example, polytetrafluoroethylene has been found very suitable. The mass leaving the feed line 40 accumulates before a predistributor member 22 which is spaced by a predetermined distance from the surface of the distribution plate 20. As illustrated the predistributor member 22 is polygonal in cross-section having one surface positioned parallel with the surface of the distribution plate to form a parallel sided passage or slit therewith. The predetermined distance is variable by appropriate holding means 24, 25 and adjustment means 26, 27. In the illustrated embodiment, these means comprise angular supports 24, 25 secured to the distribution plate and carrying the predistribution member 22 by means of screws 26, 27 provided with nuts or the like threaded members. The mass passes through the slit between the predistributor 22 and the surface of the distribution plate 20 and emerges in a broad front which is, however, not yet fully uniform in thickness. The main distributor 28 is disposed downstream from the predistributor 22 and consists of a blade member which is carried in supports 30, 31 for vertical adjustment relative to the distribution plate 20. By the distribution of the mass by the distributor 22 it is achieved that the mass reaches the slit between the main distributor 28 and the distribution plate 20 in a broad front and leaves the slit without detrimental damming effects in a broad at least substantially completely uniform layer. In the illustrated embodiment, the lower surface of the distribution plate 20 is bevelled at the edge forward in the direction of flow and terminates in a knife-like edge 23. This edge contacts the surface 10 of a pressing or rolling device onto which the mass is to be fed. By the knife-like resilient construction of the edge 23 it is achieved that the mass steadily and evenly flows onto the continuously passing surface 10.

The distribution plate 20 is provided with an inlet 33 and an outlet 32 for heating or cooling agents. A heat exchange system such as a tubular coil through which the heating or cooling agents are circulated is provided within or at the bottom of the distribution plate 20. Whether heating or cooling of the plate is required depends on the nature of the mass to be processed, as stated above.

The adjustment of the slope of the distribution plate 20 can be made by mechanical or hydraulic means; the embodiment as shown in FIG. 2 is provided with a hydraulic cylinder 50 which engages the distribution plate 20 and is connected with its upper part to an arm 54 of the frame of the device; this cylinder can be used for raising the entire distribution device. A further cylinder 52 allows an adjustment of the slope of the distribution plate 20. FIG. 2 shows also a device for introducing a reinforcing material 41. This material is taken from a feed roll and passed via a guide roller 44 to another guide roller 42 which is variable in distance from the distribution plate 20 and the passing surface 10 of the pressing or rolling device. The reinforcing material contacts the mass a small distance behind the guide roller 42 and is—when the mass is wetting the reinforcing material—soaked and taken up by the mass. The reinforcing material may consist of a mat or non-woven fabric of various fibres such as resin fibres or glass fibres, or of a woven fabric of suitable materials.

The described device may be used, for example, to prepare from an aqueous phenol/formaldehyde resin mixture a cured sheet which may optionally be reinforced by a fibrous material. The aqueous resin mixture is precondensed after the components have been mixed and the accelerator (usually an acid) is added only immediately before the mass is fed into the distribution device. Between addition of the accelerator and introduction of the mass into the pressing device there is usually only a maximum time of about 300 seconds after which the mass is no longer sufficiently flowable. Due to the exothermic condensation reaction, the temperature of the mass rises within this time from about 8° to 20° C., provided that the distribution plate is cooled with cold water. Within said time the mass remains sufficiently flowable to flow under the predistributor 22 and the main distributor 28 to the passing surface 10. The distribution device allows a completely uniform spreading of the mass over the entire width of the plate and the rolling or pressing device. This width may amount, for example, to 1 meter or more.

I claim:

1. A device for evenly distributing a quickly solidifying flowable mass over a surface, such device comprising a distributor plate having a surface inclined in the direction of flow, a feed line for discharging the flowable mass onto the inclined surface of the distribution plate, a predistributor narrower than the desired final extent of spreading located downstream of the feed line and spaced from the surface of the plate for initially spreading the flowable mass widthwise of the plate, and a main distributor arranged downstream of the predistributor and spaced from the surface of the plate for distributing to the full width the initially distributed mass, and means for varying the spacing of the distributors from the plate surface for controlling the thickness of the layer to be formed.

2. A device according to claim 1, wherein the predistributor is a polygonal section bar adjustably mounted for variation of its distance from the surface of the distribution plate.

3. A device according to claim 2, wherein one surface of the polygonal section bar is positioned parallel with the surface of the distribution plate to form a parallel sided passage therewith.

4. A device according to claim 1, wherein the main distributor is a blade adjustably mounted for variation of its distance from the surface of the distribution plate.

5. A device according to claim 1, wherein the surface of the distribution plate is provided with a coating for reducing the adhesion of the mass thereto.

6. A device according to claim 5, wherein the coating comprises polytetrafluoroethylene.

7. A device according to claim 1, wherein the distribution plate is provided with heat exchangers and inlet and outlet means for cooling or heating agents.

8. A device according to claim 1, wherein the distribution plate ends in a knife-like edge for transferring the distributed mass to a continuously passing surface of a pressing or rolling device.

9. A device according to claim 1, wherein means are provided for varying the slope of the distribution plate.

10. A device according to claim 1, wherein means are provided for introducing a reinforcing material for incorporation into the distributed mass.

11. A device according to claim 10, wherein the means for introducing reinforcing material comprises an adjustable roller downstream of the distribution plate.

References Cited

UNITED STATES PATENTS

| | | | |
|---|---|---|---|
| 1,711,732 | 5/1929 | Holman | 118—407X |
| 2,030,572 | 2/1936 | Donninz | 118—407X |
| 2,060,897 | 11/1936 | Richardson et al. | 118—325X |
| 3,177,847 | 4/1965 | Schnierleen | 118—407 |

JOHN P. McINTOSH, Primary Examiner